Figure 17:
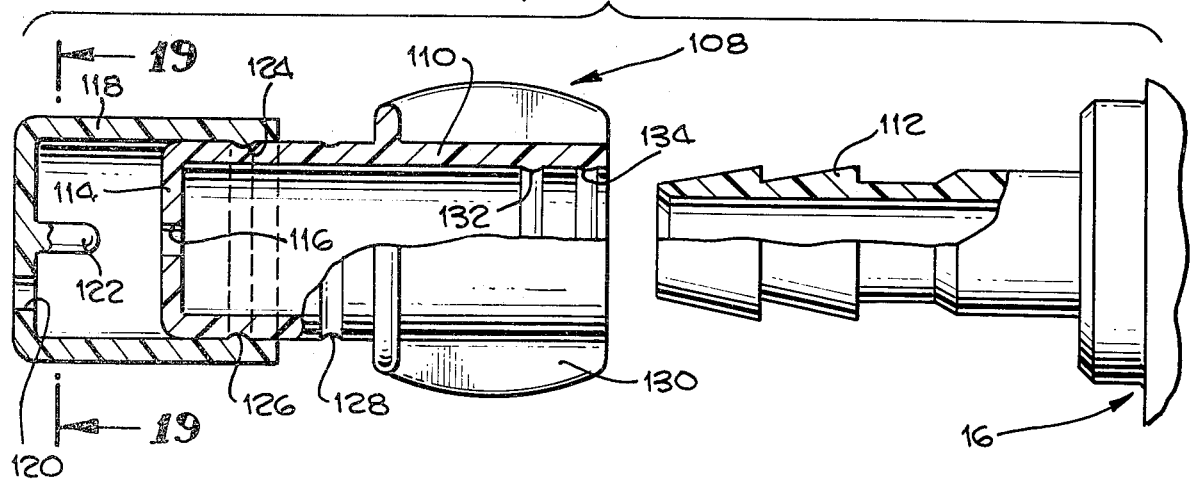

//www.w3.org/1999/xhtml">
United States Patent [19]

Markley et al.

[11] 4,238,340

[45] Dec. 9, 1980

[54] HEMODIALYZER

[75] Inventors: Finley W. Markley, Burnsville; Thomas H. Benham, Apple Valley; Raymond M. Lukes, Eagan, all of Minn.

[73] Assignee: Medical, Incorporated, Inver Grove Heights, Minn.

[21] Appl. No.: 35,852

[22] Filed: May 4, 1979

Related U.S. Application Data

[63] Continuation of Ser. No. 854,783, Nov. 25, 1977, abandoned, which is a continuation of Ser. No. 672,853, Apr. 2, 1976, abandoned.

[51] Int. Cl.³ .............................................. B01D 31/00
[52] U.S. Cl. .............................. 210/321.3; 210/493.1 264/257
[58] Field of Search ........... 210/321 B, 321 R, 321 A, 210/159, 493; 55/16, 158; 264/257, 286

[56] References Cited

U.S. PATENT DOCUMENTS

| | | | |
|---|---|---|---|
| 3,442,002 | 5/1969 | Geary, Jr. et al. | 55/158 |
| 3,788,482 | 1/1974 | Markley | 210/321 B |
| 3,862,031 | 1/1975 | Leonard | 210/321 B |
| 3,864,265 | 2/1975 | Markley | 210/321 B |
| 3,979,295 | 9/1976 | Markley | 210/321 B |

*Primary Examiner*—Charles N. Hart
*Assistant Examiner*—E. Rollins Cross

[57] ABSTRACT

A hemodialyzer in which a sealant anchors the edges of a plurality of generally planar semipermeable membranes to a generally rigid case. The moisture content of the membranes is maintained at approximately a constant value so as to prevent stress from being built up in the hemodialyzer due to changes in the dimensions of the anchored membranes with changes in moisture content. A stack of semipermeable membrane material is confined between wedge blocks within the hemodialyzer case. The wedge blocks permit the hemodialyzer to be assembled without placing shearing stresses on the membrane. Also, by trapping the last pleats of the membrane between the case and the outer surfaces of the wedge blocks the last pleats are easily encapsulated with sealant and thus sealed.

21 Claims, 20 Drawing Figures

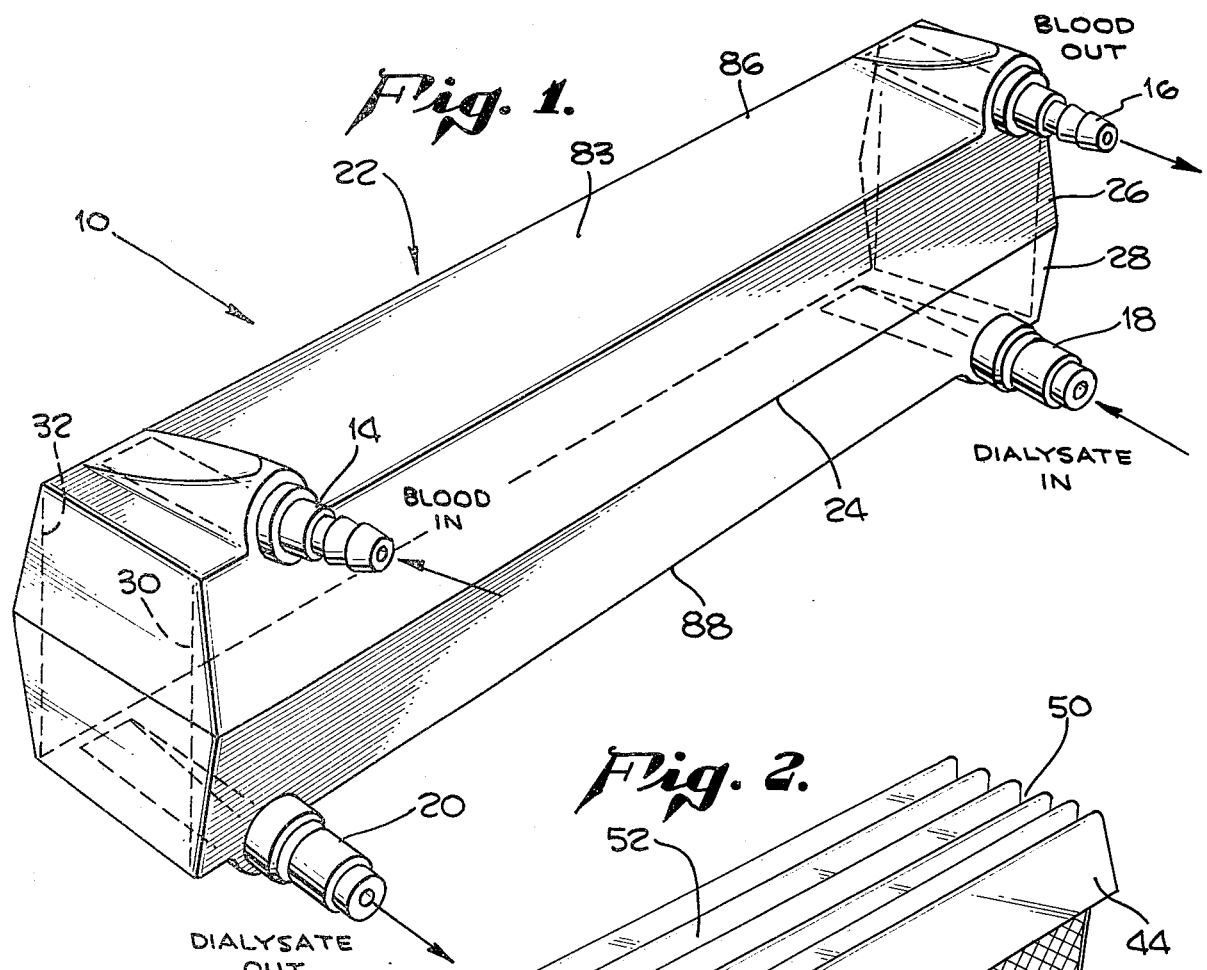
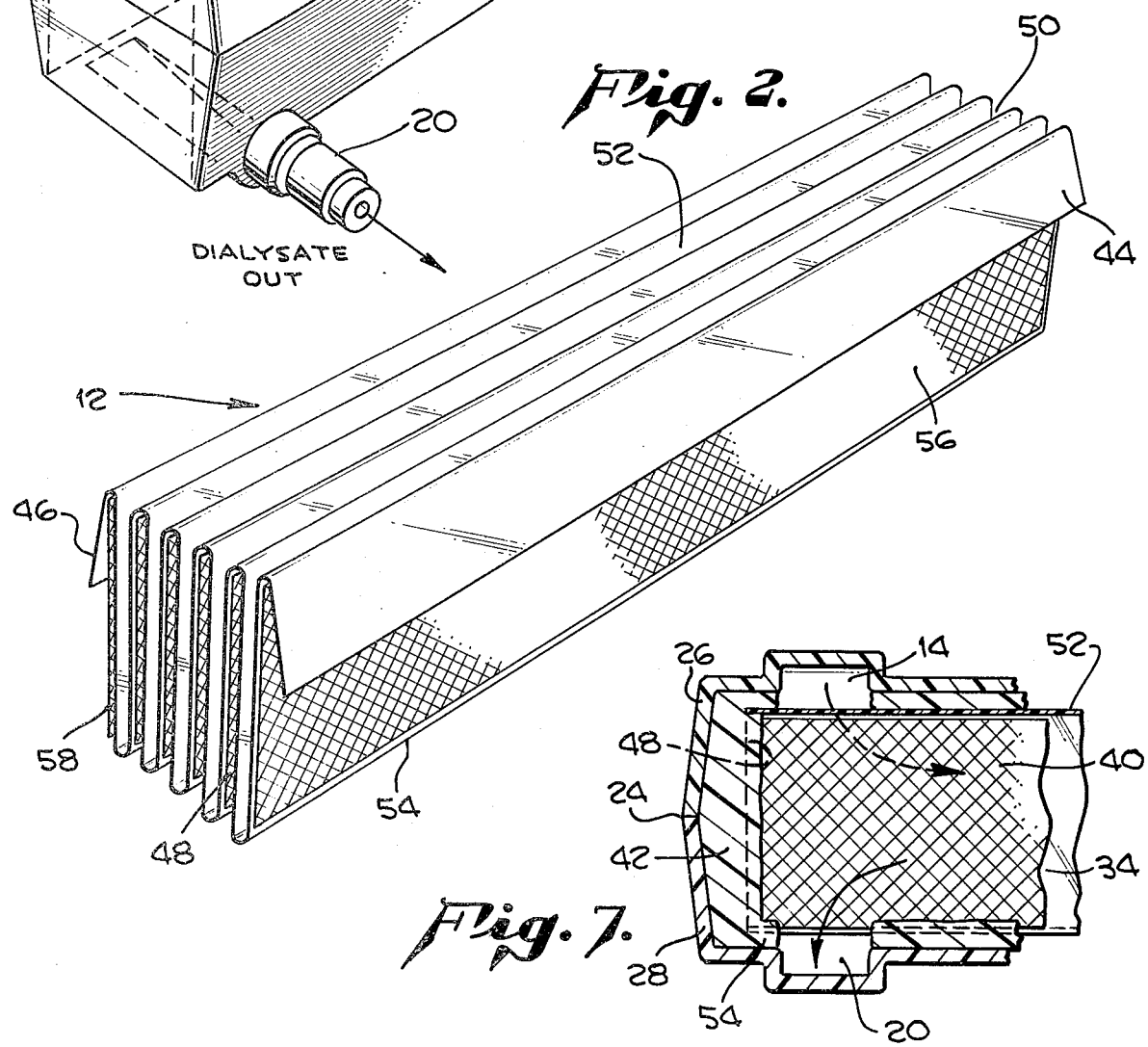
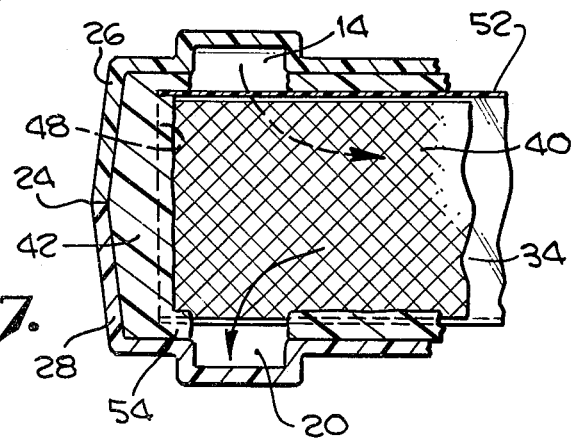

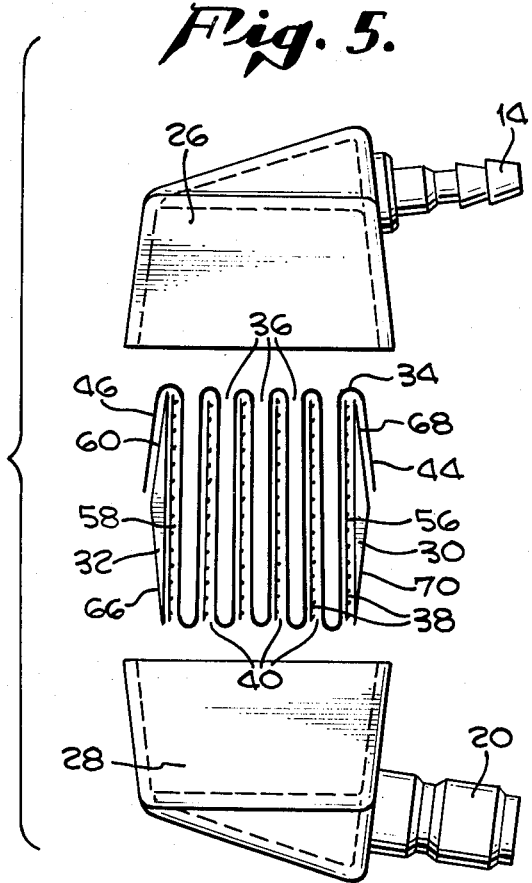

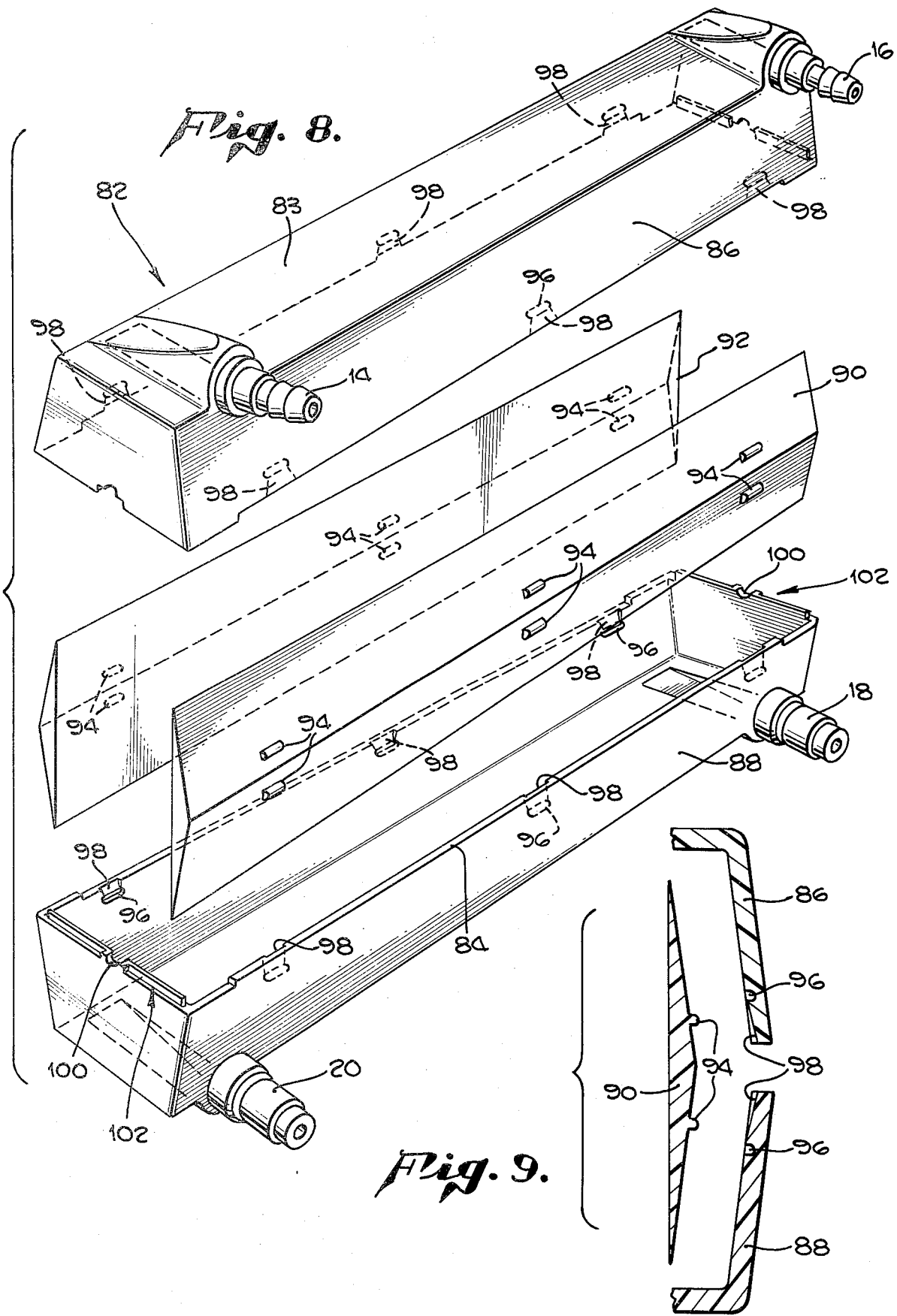

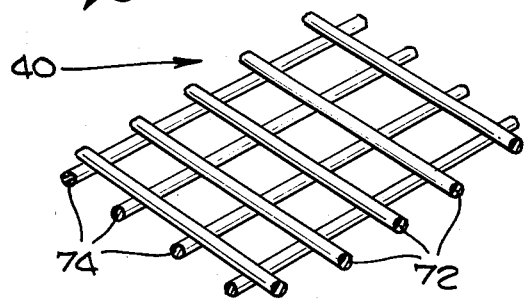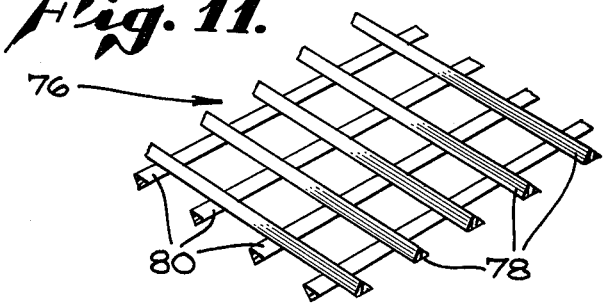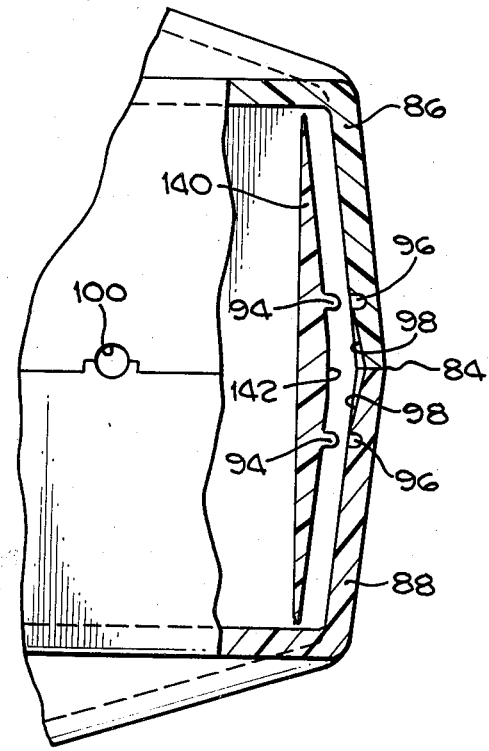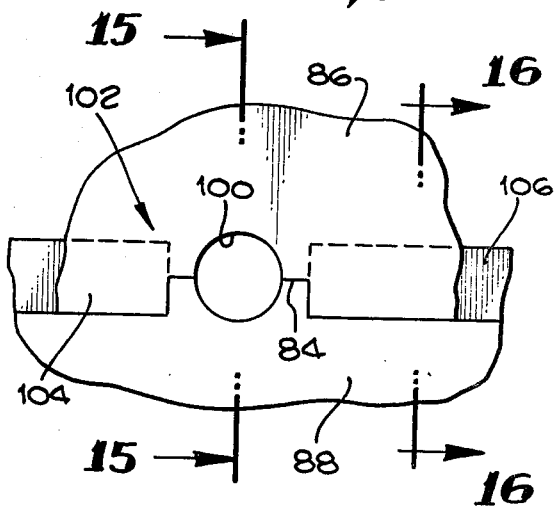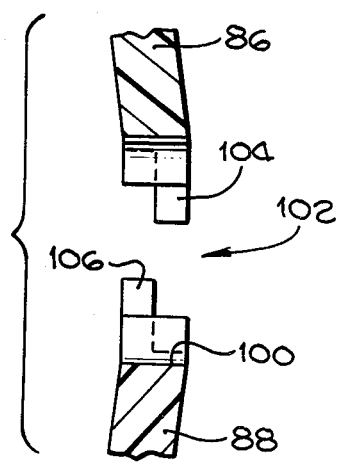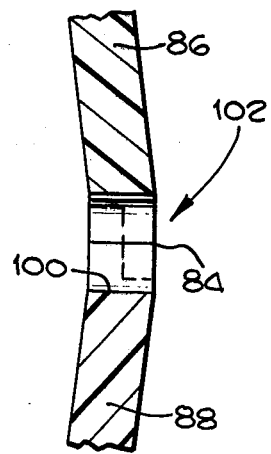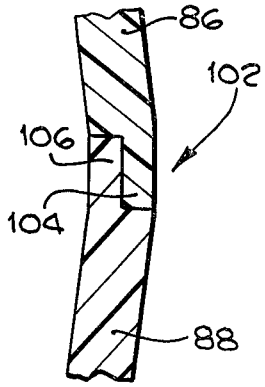

HEMODIALYZER

This is a continuation of application Ser. No. 854,783, filed Nov. 25, 1977 which is a continuation of application Ser. No. 672,853, filed on Apr. 2, 1976, and now abandoned.

This invention relates to hemodialyzers and more particularly to small lightweight hemodialyzers having a high surface area to blood priming volume which utilize semipermeable membranes sealed to a generally rigid case. Ports are divided in the case so as to permit blood and dialysate flow through the hemodialyzer.

Previously considerable difficulty had been experienced in the production of small lightweight hemodialyzers, particularly with regard to obtaining consistently good ultrafiltration rates, high wet rupture strength, absence of leakage during clinical use, and absence of torn membranes during manufacturing. These and other difficulties of the prior art have been overcome according to the present invention.

According to the present invention, a small efficient lightweight hemodialyzer is produced which includes at least one generally planar semipermeable membrane anchored by at least two of its edges for sealing purposes to a relatively rigid case. The case is provided with ports to permit the passage of blood and dialysate, preferably in countercurrent flow, through the hemodialyzer. The membrane is generally a cellulosic or other semipermeable membrane which is subject to dimensional changes with changes in its water content. In general the membranes used in the hemodialyzers shrink in all dimensions as their water content decreases. The pores of the membranes decrease in size in an irreversible process as the water content of the membranes decreases. Also, adjacent layers of membrane tend to stick together if the membranes are allowed to dry in situ in the dialyzer. This closes the blood channels in some instances. Subsequent wetting and application of negative pressure to the dialysate side occasionally is not sufficient to pull the adhered membrane layers apart. Thus, there is a substantial decrease in the capacity of the dialyzer due to the closed blood channels.

The membrane is preferably folded into a plurality of pleats so as to define a stack of membrane having a generally rectangular cross section and a compact configuration which permits, with suitable spacing elements, the flow of dialysate on one side of the membrane and blood on the other. Flow takes place in capillary flow channels. The ends and edges of the pleated membrane are sealed to the inner surfaces of the case so as to direct the flow of blood and dialysate, respectively, through the thin sheet-like passageways formed by the pleats of semipermeable membrane material. The areas of the stack of membrane which are adjacent to the ports are not sealed so as to permit the ingress of fluid to and the egress of fluid from the thin channels which are formed in the stack of film. In sealing the ends and edges of the stack of pleated membrane so as to force the fluid to flow through the stack, the stack is anchored to the inner surfaces of the case.

When the moisture content of the film is not controlled and the cellulosic or other film is anchored or sealed to the generally rigid case, the wet rupture strength of the film is considerably less than what it should theoretically be. Also, unexplained leaks occur very frequently during clinical usage. Ultrafiltration rates vary from one apparently identical hemodialyzer unit to another and are considerably lower than what they should theoretically be. Manufacturing difficulties are experienced in that the membrane occasionally tears or breaks while being handled. Occasionally during storage the rigid cases crack or deform.

When the moisture content of the membrane, and particularly cellulosic membranes, is maintained at a value which is approximately in equilibrium with air having a relative humidity of at least about 46 percent and preferably at least about 50 percent, the ultrafiltration rates are generally consistent; the wet burst strength improves dramatically; no more cracks or deformations are observed in the cases; and the clinical leaking of the hemodialyzers is virtually eliminated as is the tendency of the membrane to break and tear during manufacturing.

In order to obtain the advantage of this invention, it is necessary that the water content of the membrane in the hemodialyzer be maintained at a value which prevents the membrane from shrinking to any significant degree. Shrinkage is considered significant when it increases the tension of the membranes in the hemodialyzer to the point where the wet burst strength decreases by more than approximately 100 millimeters of mercury pressure from that wet burst strength exhibited by a hemodialyzer in which no shrinkage has occurred from its as manufactured dimensions. Preferably the water content of the membrane is maintained at a value which prevents the membrane from shrinking to any significant degree from the time it is manufactured until the time a hemodialyzer which incorporates the film is used. Thus, in the preferred operation the film is manufactured to a completed state containing the desired moisture content and is then stored, transported, formed into a hemodialyzer which is again stored and transported to the site of end use, all without any significant change in the moisture content of the membrane.

Preferably the cellulosic membranes utilized according to the teachings of the present invention are manufactured by a cuprammonium process. In general the cuprammonium process for the manufacture of cellulosic film includes dissolving cotton or wood pulp in an ammoniacal copper solution which is injected through a slit orifice into a setting bath of dilute sulfuric acid. The present invention is applicable to cellulosic film manufactured by the viscose process; however, generally hemodialyzers which are manufactured utilizing cellulosic films made by the viscose process do not produce as satisfactory a clinical result as do those hemodialyzers which utilize cellulosic films manufactured by the cuprammonium process.

The cellulosic films used according to the teachings of the present invention include those having thicknesses ranging from about 10 to 20 microns, although somewhat thinner and thicker films may be used if desired. These membranes are capable of removing both toxins and drugs from blood.

In general, a sealant is used to seal the ends and sides of the generally planar, parallel blood and dialysate flow channels within the stack of membranes. This sealing is provided, except in the area of the ports, so that the blood and dialysate are prevented from flowing around the edges of the membrane so as to become intermixed. Also, the fluids are prevented from flowing between the stack and the case in areas where no significant dialysis can take place. No dialysis takes place between fluids that bypass the stack. The sealant for both the shunt sealing and the blood-dialysate sealing is applied in the liquid state and flows to fill the space between the sides and ends of the stack of membrane and the case and conforms to both the membranes and the case. Preferably, the sealant does not readily wet the membrane so that the meniscus formed in the openings of the flow channels will be smooth and blunt rather than sharp and thin. Each individual pleat of membrane is anchored solidly to the case by the cured in situ sealant at each of its four edges. Any shrinkage of the membrane will place the membrane in tension so as to decrease its wet rupture strength. If the shrinkage is great enough, the membrane will rupture or the case will crack or deform under the force of the resulting tension. The use of a relatively flexible sealant, such as a polyurethane material, will permit the accommodation of a slightly greater amount of shrinkage than will the use of a relatively rigid sealant, such as an epoxy material. Preferably the sealant is one which is flexible and extensible and undergoes elastic deformation under the loads encountered in the hemodialyzer. The sealant need not adhere strongly or at all to the membrane because the membrane takes up water and swells during use, thus effecting a tight seal wherever it is confined within a body of cured solid sealant. If the sealant is not adhered to the membrane, the hemodialyzer will be able to withstand somewhat higher pressures because the membrane can move slightly to distribute loads as necessary, and the juncture between the membrane and the non-wetting sealant at the blood and dialysate flow channels provides a smoothly contoured support for the membrane. The sealant should be one that will not crack under bending or tensile loads.

Preferably the sealant is possessed of thixotropic characteristics so that it penetrates uniformly into the stack but is prevented from being pulled by capillary attraction into the channels. Thixotrophy also prevents the sealant from flowing into the channels due to the action of gravity. Using a sealant which has thixotropic characteristics also enables the achievement of a smooth blunt meniscus in the channels so that sharp points and edges which might tend to cut the membrane are avoided.

The specific embodiments illustrated in the drawings are provided for the purpose of illustration only and not to limit the invention.

Figure 18:
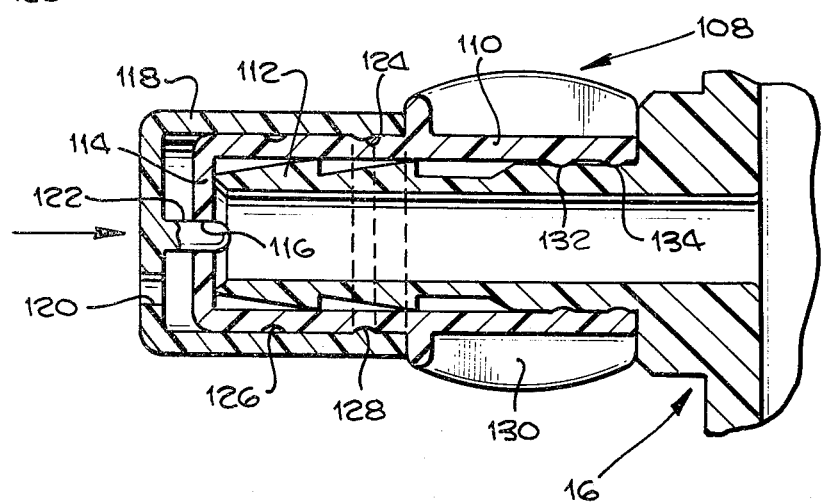
Figure 19:
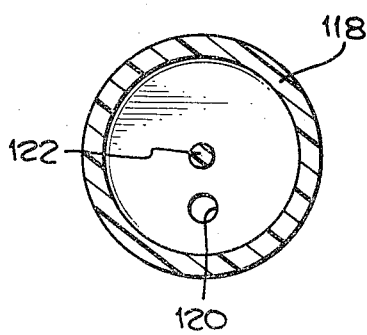

Referring particularly to the drawings, there is illustrated:

FIG. 1, a perspective view of a hemodialyzer case according to the present invention;

FIG. 2, a perspective view of a stack of semipermeable membrane material folded into a plurality of pleats to define respective blood and dialysate flow channels and adapted to be contained within the case illustrated in FIG. 1;

FIG. 3, a perspective view similar to FIG. 2 showing sealant applied to the stack;

FIG. 4, a broken cross-sectional view taken along line 4—4 of FIG. 3;

FIG. 5, an exploded elevational view of an assembled hemodialyzer;

FIG. 6, a broken cross section view taken along line 6—6 of FIG. 3 and including the hemodialyzer case and sealant;

FIG. 7, a broken cross-sectional view taken along line 7—7 in FIG. 3 through a dialysate flow channel and including the hemodialyzer case and sealant;

FIG. 8, a perspective exploded view of a further embodiment of a hemodialyzer case including snap lock and alignment elements;

FIG. 9, a broken cross-sectional view of the embodiment of FIG. 8;

FIG. 10, a perspective view of a membrane separator;

FIG. 11, a perspective view of a further embodiment of a membrane separator;

FIG. 12, a cross-sectional view of a further embodiment of a hemodialyzer case in which a sealant receptacle is provided at the parting line of the case halves;

FIG. 13, a broken elevational view of a further embodiment having a lap joint reinforcement at the case ends;

FIG. 14, an exploded cross-sectional view of the embodiment illustrated in FIG. 13;

FIG. 15, a cross-sectional view taken along line 15—15 in FIG. 13;

FIG. 16, a cross-sectional view taken along line 16—16 in FIG. 13;

FIG. 17, a cross-sectional view of a two stage port seal;

FIG. 18, a view similar to FIG. 17 showing the port seal in the sealed configuration;

FIG. 19, a cross-sectional view taken through line 19—19 of FIG. 17; and

Figure 20:
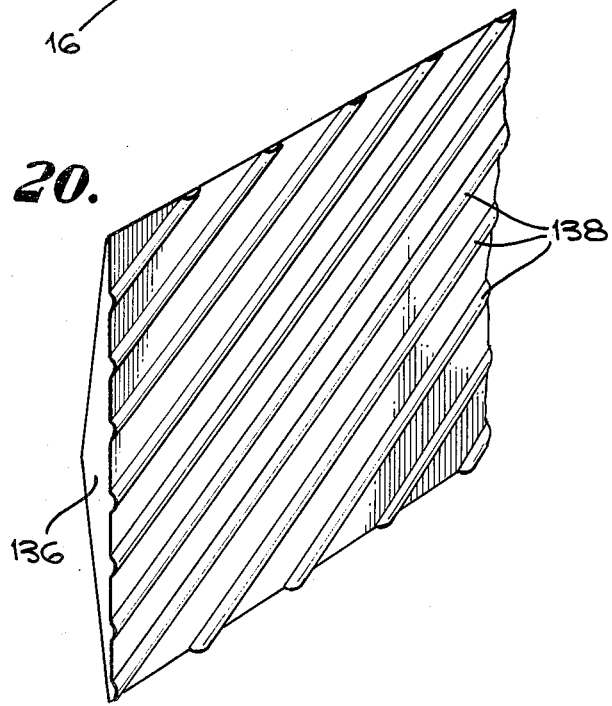

FIG. 20, a perspective elevational view of a further embodiment of a wedging element.

Referring particularly to the drawings, there is illustrated a hemodialyzer case 10 and a stack of semipermeable membrane 12 folded into a plurality of pleats and adapted to be contained within hemodialyzer case 10. Case 10 is provided with an inlet blood port 14 and an outlet blood port 16. Dialysate inlet port 18 and dialysate outlet port 20 are provided so as to permit countercurrent flow of blood and dialysate through the hemodialyzer. The respective blood and dialysate ports include plenum chambers formed in the case immediately over the membrane so as to permit uniform distribution of fluid across the hemodialyzer. The respective blood and dialysate ports are designed with different coupling configurations so that it is impossible to connect them improperly to a kidney dialysis machine. The hemodialyzer case 10 includes a shell 22 which is divided along a parting line 24 into a first part 26 and a second part 28. Parts 26 and 28 are in the form of regular trapezoids, the larger base of each part occurring at the parting line 24. First wedging element 30 and second wedging element 32 are provided within shell 22 to act as wedging members to compress the stack 12 and allow assembly of the hemodialyzer without subjecting the membrane to shearing stresses, and to provide for the sealing of the last pleat of membrane 34. The wedging elements 30 and 32, respectively, have obtuse triangular cross sections with the apex of the triangle extending at about the parting line 24 and the base of the triangle forming one wall of a generally rectangular cavity into which stack 12 is received. Membrane 34 is folded into pleats so as to define generally planar parallel blood flow channels 36 and dialysate flow channels 38. Dialysate permeable separators 40 are positioned within the dialysate flow channels 38 so as to provide support and permit the formation of thin flow channels 36 and 38 within stack 12. The blood flow channels are of capillary size when blood is flowing through them.

Stack 12 is received within the rectangular cavity defined by shell 22 and wedging elements 30 and 32 and is sealed therein by sealant 42, illustrated particularly in FIGS. 3, 6, and 7. Membrane 34 is continuous from where the last pleat 44 overlaps one wedging surface of first wedging element 30 to last pleat 46 which overlaps one of the wedging surfaces of the second wedging element 32. In order to prevent the intermixing of the dialysate and blood, it is necessary to seal first end 48 and second end 50 of stack 12 and last pleats 44 and 46 so that there is no open path between the blood flow channels and the dialysate flow channels. The sealant penetrates the channels at ends 48 and 50, and the blood flow channels 36 on first channel opening side 52 and the dialysate flow channels 38 on second channel opening side 54. The membrane is shorter than the interior length of the case so as to provide a space for sealant to flow uniformly into the ends of the stack, thus insuring complete encapsulation of the membrane edges. The last pleats 44 and 46 are sealed with sealant at the first channel parallel side 56 and second channel parallel side 58 as shown inslightly expanded form in, for example, FIG. 5. The last pleat 46 is trapped between wedging surface 60 on second wedging element 32 and wedging surface 62 on the first part 26 of shell 22. Wedging surfaces 60 and 62 extend coangularly so that when last pleat 46 is trapped between the surfaces it is supported on both sides by the surfaces. Sealant 42 is applied on both sides of last pleat 46 so that the edges of this pleat are sealed to prevent fluids from passing around them. Last pleat 44 is likewise trapped between the coacting wedging surfaces of first wedging element 30 and the first part 26 of shell 22 and encapsulated with sealant. The sealant fills the voids between the base walls of parts 26 and 28 and the respective channel opening sides of stack 12 so as to prevent fluid from shunting past the stack through these voids. Wedging surfaces 64 and 66, respectively, extend generally coangularly with one another and are in contact with one another, although they are shown slightly separated in FIG. 6 for the purposes of illustration.

In the completely manufactured form the dialyzing membranes are arranged as a plurality of closely spaced generally planar rectangular membranes. Each individual planar membrane is anchored on all four of its edges, except adjacent the ports, to the rigid case. The structure is arranged so that blood flows in capillary flow thin sheet-like channels on one side of the membrane, and dialysate flows in capillary flow on the opposite side of the membrane through an initially somewhat thicker sheet-like channel. The membranes are supported so as to withstand substantial transmembrane pressures without bursting or shifting out of position by an open mesh support member on one side of each membrane. The support members are on the dialysate side of the membranes so as to support the membranes against the higher pressures on the blood side. The support members are anchored by direct contact with the sealant on the second channel opening side 54 and indirectly through the membrane on the first channel opening side 52. The relatively stiff support members prevent the membranes from shifting so as to open a few large flow channels through which all of the fluid would flow.

The wedging surfaces provided by the shell and wedging elements are utilized in the construction of the hemodialyzer. The semipermeable membrane 34 is withdrawn from the substantially vapor proof container in which it has been transported and stored from its site of manufacture, and it is folded in a humidity controlled environment into a plurality of pleats with the dialysate permeable separators 40 in alternate pleats. The resultant stack 12 of semipermeable membrane is then placed between wedging elements 30 and 32, as shown for example in FIG. 5. A sealant material in the liquid phase is applied to the inner surfaces of shell 22 in those areas where sealing is required. Also, sealant is applied at least to surfaces 60 and 68 and to surfaces 66 and 70, if desired. The stack of semipermeable membrane 12 including the membrane 34, the dialysate permeable separators 40 and the wedging elements 30 and 32 is inserted into second part 28 of shell 22. The coaction between the wedging surfaces 66 and 70 and the adjacent outwardly tapered coangular surfaces of second shell part 28 results in the assembly of the stack 12 to the lateral dimension that it will occupy in the completed hemodialyzer. The first part 26 of shell 22 is then placed over the stack until the two halves of 22 are brought together at parting line 24 without subjecting the membrane to shearing forces. The case halves are held together by a band of tape bridging the parting line 24 and extending substantially entirely around the case. Sealant is then injected into the void space at the ends 48 and 50 of the stack 12 so as to seal the ends of the flow channels 36 and 38. The stack is preferably compressed prior to assembly. The assembly returns slowly to its precompressed dimensions so that when it is compressed and immediately assembled into the case, the assembly is easily accomplished and the stack is in the compressed state within the case after it has recovered from the preassembly compression. This results in achieving blood passages having a uniform thickness. Because the stack 12 is already compressed when first part 26 of shell 22 is placed over the stack 12, the last pleats 44 and 46 are not forcibly contacted by the adjacent outwardly tapering coangular walls of the first part 26 of shell 22 until the shell halves are almost in contact with one another along parting line 24. In this way the last pleats 44 and 46 are not torn by reason of the shearing action of one wall sliding against another with the last pleats trapped therebetween. There is enough contact between the wedging surfaces as the shell halves are drawn together with the last pleats 44 and 46 trapped therebetween so that the last pleats are drawn taut but not enough so that they risk being torn. The sealant is cured and the hemodialyzer is sterilized by gas sterilizing procedures.

Referring particularly to FIGS. 10 and 11, there is illustrated two specific embodiments of dialysate permeable separators. Dialysate permeable separator 40 is composed of round elongated filaments 72 and 74, respectively. The filaments 72 extend generally in the same plane and are approximately parallel to one another. The filaments 74 extend generally at approximately right angles to filaments 72. Filaments 74 are generally in a second plane which extends adjacent to and parallel with the plane in which filaments 72 are located. In operation the membrane on either side of dialysate permeable separator 40 tends to depress into the spaces between the respective filaments 72 and 74. Under pressure surges on the blood side the membranes meet at about the midpoint between the planes which contain the respective filaments. The membranes meet under pressure surges at about the plane which includes the contact points between the respective filaments. Apparently, the membranes are forced into contact with one another in the interstices of the dialysate permeable separator 40 only during pressure surges or when the pressure on the blood side is considerably higher than it is on the dialysate side of the membranes. The dialysate permeable separator indicated generally at 76 in FIG. 11 is a further embodiment in which the elongated filaments have a generally triangular cross section with contact between the filaments taking place between the bases of the filaments. The arrangement and operation of the dialysate permeable separator 76 is generally the same as that described with reference to dialysate permeable separator 40.

Referring particularly to FIG. 8, a further embodiment of a hemodialyzer case indicated generally at 82 is illustrated in which lap joint structures are provided at the respective ends of the case, and alignment and snap lock features are provided to facilitate the alignment of the parts of the case during assembly and to retain the parts in assembled configuration. The hemodialyzer case 82 includes a shell 83 which is divided into two parts along a parting line 84. The first part of shell 83 is indicated at 86 and the second part at 88. A first wedging element 90 is received within shell 83 on one side of the hemodialyzer case 82 and a second wedging element 92 is received within shell 83 in a position opposed to first wedging element 90. The arrangement and interrelationships between the elements of the hemodialyzer case 82 are generally the same as those described previously with reference to hemodialyzer case 10.

A snap lock and alignment structure is provided in hemodialyzer case 82 and includes locking tabs 94 which project outwardly from the respective wedging faces or surfaces of first and second wedging elements 90 and 92, respectively. The locking tabs 94 are positioned so that when the case halves 86 and 88 are brought together in fully assembled relationship the locking tabs will project into and interlock with grooves 96. As the case halves are advanced towards one another the locking tabs 94 are received in and guided by alignment ramps 98 so that as the case parts are drawn together they are automatically aligned by the interaction of locking tabs 94 with alignment ramps 98.

Sealant injection ports 100 are provided at opposite ends of hemodialyzer case 82. Ports 100 permit the injection of sealant into the ends of a stack of semipermeable membrane confined within case 82 so as to encapsulate the ends of the stack of semipermeable membrane and prevent the intermixing of blood and dialysate. Lap joints 102 are provided at the ends of case 82 so as to reinforce the ends and confine the sealant. The lap joints 102 are provided at parting line 84 and include an outer tongue 104 which is provided in first part 86 and is received in a mating groove in second part 88. An inner tongue 106 projects from second part 88 into a mating groove in first part 86. The lap joints 102 extend across the ends of the hemodialyzer and for a short distance along the sides of the hemodialyzer.

Referring particularly to FIGS. 17, 18, and 19, there is illustrated an embodiment of a port seal which is applicable to both the blood and dialysate ports although for the purposes of illustration only blood port 16 is illustrated. The port seal indicated generally at 108 includes a sleeve 110 which is adapted to be slidably received in snug, sterile, sealing relationship on male fitting 112. Male fitting 112 is adapted for connection to a kidney dialysis machine. Sleeve 110 has a ported end 114 in which an inner port 116 is axially located. A two stage cap 118 is slidably received over the outer exterior end of sleeve 110. Two stage cap 118 is provided with an outer port 120 and a port plug 122 which is axially aligned with inner port 116. Two stage cap 118 is snugly received in sliding sealing relationship with the exterior outer end of sleeve 110. A ring 124 is provided on the cylindrical interior wall of two stage cap 118. Ring 124 is positioned so that it is in cooperating relationship with first stage groove 126 on the exterior cylindrical surface of sleeve 110 when the port seal is in a first open configuration, and with second stage groove 128 when port seal 108 is in a second closed configuration. When port seal 108 is positioned over male fitting 112, the fitting is protected from contamination and is maintained in a sterile condition. When two stage cap 118 is in the open configuration, as shown for example in FIG. 17, ambient fluid is free to pass through outer port 120, inner port 116, and into the interior of the hemodialyzer through male fitting 112. When two stage cap 118 is moved to the closed configuration, as illustrated for example in FIG. 18, the port plug 122 is received in inner port 116 in a snug sterile fit so that fluid cannot pass through inner port 116 in either direction. The fit between port plug 122 and inner port 116 is sufficiently snug so that there is no leakage of either liquid or gaseous phase fluids through this port when the port seal 108 is in the closed configuration. If desired, a bacteria impervious filter (not illustrated) may be used in outer port 120. Sleeve 110 is provided with an enlarged area 130 so as to permit its being grasped and inserted over male fitting 112 without risk of moving two stage cap 118 from its open to its closed configuration. Rings 132 and 134 are provided on the interior cylindrical wall of sleeve 110 so as to provide a sterile seal with male fitting 112.

Referring particularly to FIG. 20 there is illustrated an additional embodiment of a wedging element. Wedging element 136 is provied on the planar stack side thereof with half round ridges 138. Ridges 138 extend generally at an angle of approximately 45° to the longitudinal axis of the wedging element 136. Half round ridges 138 conveniently replace the last dialysate permeable separator on each side of the stack of membrane material. The half round ridges 138 provide a depth from the outermost point on the ridge to the flat subsurface of the wedging element 136 which is approximately one-half that depth provided by a full dialysate permeable separator. In the structure where a dialysate permeable separator is next to the innerface of a wedging element the membrane which is supported by that separator tends to be forced under pressure surges by the blood to stretch for the full depth of the separator until it comes into contact with the surface of the wedging element. Thus, the last full membrane is sometimes required to stretch twice as far as are the other membranes within the stack. The other membranes need only stretch half way through the depth of the separator because they are met by a membrane on the other side which is likewise stretching half way through the depth of the separator. By using the half round ridges 138 on the surface of the wedging element 136 in place of a full separator, the last full membrane on each side of the stack of membrane is only required to stretch the same amount as the other membranes. This avoids the possibility that excessive stress will be placed on the last full membrane on each side of the stack under unusual operating conditions.

Referring particularly to FIG. 12, there is illustrated an embodiment of the wedging element in which the apex of the triangle formed by the wedging surfaces has been removed. Wedging element 140 is provided at the apex of the wedging element with a planar surface 142. When planar surface 142 is brought into operative cooperative relationship with the case halves 86 and 88, a small sealant receptacle is provided adjacent parting line 84 so that any excess sealant which may be on the wedging surfaces of wedging element 140 has a place to collect without interfering with the closure of the case.

The entire manufacturing of the hemodialyzer from the time the semipermeable membrane is removed from its vapor tight container to the time when the manufacture and sterilization of the hemodialyzer is complete is accomplished under conditions which maintain the moisture content of the semipermeable membrane at about the desired values. The blood ports and dialysate ports are sealed with removable sealing members so that during transportation and storage of the completed hemodialyzer there will be no substantial change in the moisture content of the membrane. Under conditions of constant moisture content the dimensions of the membrane and, thus the stresses in the case and membrane, will not change from those that were in existence at the time the manufacture of the hemodialyzer was completed. The stresses in the hemodialyzer as manufactured are low. As a result the hemodialyzer is capable of withstanding relatively high pressures for short periods of time during use. Such elevated pressures often occur for short periods of time during the normal usage of a hemodialyzer. In general the short term wet rupture strength of the present hemodialyzer is in excess of about 1,200 millimeters of mercury, utilizing an 11.5 micron thick semipermeable membrane.

One example of a hemodialyzer manufactured according to the teachings of the present invention has overall exterior dimensions of about 11¾ inches by 1¾ inches by 2 inches and weights 338 grams. The fittings which provide for the necessary connection with a dialysis machine project somewhat beyond these dimensions so as to provide a convenient means for coupling the hemodialyzer to the dialysis machine. The rectangular cavity which receives the stack 12 within the hemodialyzer has dimensions of about 11⅛ inches by 1¾ inches by 1⅜ inches. The obtuse angle at the apex of the triangular shaped wedging elements is about 165 degrees. The shell parts are constructed of polycarbonate having a generally trapezoidal cross-sectional shape with the larger base of the trapezoid being at the parting line. The walls of the shell parts taper outwardly towards the parting line coangularly with the adjacent surfaces of the wedging elements at an angle of about 7 degrees. The membrane has a total area of about 1.4 square meters and a thickness of about 11.5 microns. The membrane is a cellulosic material manufactured by the cuprammonium process. It is folded from side to side to provide 62 dialysate channels and 61 blood channels. A flexible urethane sealant having a Shore A hardness of 65 is used to seal the hemodialyzer. The sealant is applied in the liquid form and cured to the solid state in situ. The sealant does not thoroughly wet the membrane. The dialysate permeable separators are an open mesh nonwoven polypropylene material in which round polypropylene filaments having a thickness of approximately 0.010 inch are laid over and adhered to one another so that they intersect at an angle of about 90 degrees. The dialysate permeable separators are arranged so that the individual filaments extend at an angle of approximately 45° to the longitudinal axis of the hemodialyzer. The filaments are adhered to one another at their intersections without being interwoven so that all of the filaments which extend generally in the same direction are located in about the same plane, and those filaments which extend at right angles thereto are located in a second plane immediately adjacent to the first plane. The open spaces between the filaments are generally rectangular and are approximately 0.063 inch wide. The lateral dimensions of the blood and dialysate flow channels in the completed sealed unit are about 10¾ inches by 1½ inches. About 1.2 square meters of membrane surface area is available for dialysis. All of the fluid flow within the dialyzer except that which takes place immediately adjacent the ports is confined within the stack of membrane. The volume of blood which is required to prime the dialyzer and which remains in the dialyzer after use is completed is very small. The residual blood volume is about 2.2 milliliters. In use the urea clearance rate at a blood flow rate of 200 milliliters per minute and a dialysate flow rate of 500 milliliters per minute is about 146 milliliters per minute. The creatinine clearance at the same flow rates is about 110 milliliters per minute. The pressure drops at these flow rates are 10 and 20 millimeter of mercury across the blood and dialysate sides, respectively, of the hemodialyzer. The ultrafiltration rate is about 3.0 milliliter per hour per millimeter of mercury pressure. The dialysate is degased according to conventional procedures before being passed through the hemodialyzer. The short term wet burst strength is about 1,200 millimeters of mercury transmembrane pressure.

The multiple bood pathways are very thin and undulate somewhat along their length due to the configuration of the dialysate permeable separators. The undulation of the blood flow pathways insures that the entire volume of blood will be circulated into contact with the semipermeable membrane so that efficient dialysis takes place. The total void volume of the dialyzer is about 310 milliliters. The configuration and materials of construction are such that the hemodialyzer is capable of being dry sterilized. Also, a gas can be used to test the hemodialyzer for leaks. The low blood and dialysate pressure drops across the hemodialyzer makes possible very small obligatory ultrafiltration rates. The hemodialyzer is operated with the pressure on the blood side higher than that on the dialysate side so that in the event of a leak dialysate will not be pumped into the patient. Increasing the transmembrane pressure to 500 millimeters of mercury results in a very high ultrafiltration rate. The clearance rates do not decrease to a significant degree with usage during one single treatment. Clearance rates apparently do decrease somewhat if the hemodialyzer is reused a second time. Decreasing the dialysate flow to 300 milliliters per minute does not result in an excessive decrease in clearance rates.

In general the materials of construction from which a hemodialyzer constructed according to the present invention is built are those materials which are compatible with blood and which are nontoxic. The sealant should be an extensible material which has a Shore A hardness of from about 50 to 70 and preferably from about 55 to 65 and which in the uncured state is a thixotropic liquid. The sealant must be curable in situ within the assembled hemodialyzer and must be capable of encapsulating and sealing the edges of the membrane. The extensibility of the cured sealant has a substantial influence on the device's operation. Wet burst strengths of from about 400 to 450 millimeters of mercury of pressure are encountered when the sealant is a rigid epoxy material having a Shore A hardness which is beyond the Shore A scale. The utilization of a polyurethane sealant having a Shore A hardness of 65 increases the wet burst strength to about 750 millimeters of mercury pressure. Controlling the ambient conditions within the device so as to prevent the build up of stresses also substantially improves the operation of the device. Maintaining the tension in the membrane at as manufactured values until end use results in further increasing the wet burst strength to about 1,200 millimeters of mercury pressure. The membrane must be a material which is of such a character and thickness that it will act to permit dialysis to occur. Preferred membranes are those cellulosic membranes which have been manufactured according to the cuprammonium process; however, membranes of materials such as polyacrylonitrile, cellulose acetate, polypeptide, and the like, for example, can also be used. For those membranes which change dimensions with changes in humidity and other variables, so as to set up stresses within the hemodialyzer, it is necessary to maintain the moisture content and other conditions within the hemodialyzer at approximately constant values as disclosed herein. The separator need not be a material to which the sealant will bond, although it should be a material which is somewhat compressible and yet has a memory which will allow it to return slowly to its uncompressed state. The separator material should also be sufficiently stiff so that it is easy to handle during assembly of the hemodialyzer. The use of a compressible separator which has a plastic memory advantageously permits the stack of membrane to be compressed prior to being inserted into the case halves. In this way the case halves can be drawn together without exerting shearing forces on the cellulosic membrane such as would occur if the stack were being progressively compressed by the wedging elements as the case halves ae drawn together. Suitable materials for construction of the separator include, for example, polypropylene, polyethylene, polyethylene trephthalate and the like. Suitable materials for construction of the case include relatively rigid nontoxic materials which are bondable by the sealant. Such suitable case materials include, for example, polycarbonate, acrylonitrile butadine styrene, styrene acrylonitrile, polyesters, delrin, nylon, and the like. The materials of construction must be mutually compatible. For example, the sealant must not contain materials which interact with the case, the separator, or the membrane so as to impair their structural strength or other useful characteristics.

It will be appreciated that the principle of a two stage port seal is applicable to many different medical devices. It will further be appreciated by those skilled in the art that many other embodiments of the subject matter disclosed and claimed herein in addition to those illustrated in the drawings can be constructed without departing from the spirit and scope of the accompanying claims.

We claim:

1. A hemodialyzer comprising:
a substantially rigid case having blood ports and dialysate ports therein, said case being divided along a parting line into two parts, each of said parts having a generally trapezoidal shaped cross section with said parting line extending at about the larger base of each of said parts;
a pair of wedge elements received within said case, each of the cross sections of said wedge elements being generally in the form of an obtuse triangle, said wedge elements being positioned on opposite sides of said case with the apex of said triangles at about said parting line, the legs of said triangles extending generally coangular with the adjacent inner walls of said case, and the bases of said triangles extending generally perpendicular to said parting line; and
a cellulosic semipermeable membrane folded in a plurality of pleats to define a stack of membrane having a generally rectangular cross section and including a plurality of generally parallel planar blood and dialysate flow channels defined by said pleats and opening respectively on opposite channel opening sides of said stack, the opposite sides of said stack which extend generally parallel to said channels being confined between said wedge elements, the last pleat on each side of said stack extending between and sealed to said wedge element and said adjacent inner wall.

2. A hemodialyzer of claim 1 wherein said case includes means for reinforcing said case at a portion of said parting line.

3. A hemodialyzer of claim 1 wherein said case includes a lap joint at said parting line at opposite ends of said case.

4. A hemodialyzer case comprising:
a substantially rigid case including a preformed shell member and at least one preformed wedging element, said shell member having blood ports and dialysate ports therein and being divided along a parting line into two parts, said wedging element extending generally perpendicular to said parting line, the inner walls of said shell member and said wedging element together defining a generally rectangular cavity adapted to receive a stack of dialyzing membrane, said shell member and wedging element having wedgedly coacting surfaces adapted to wedgedly coact to restrain said stack and prevent the application of shearing forces to said dialyzing membrane as said two parts are brought together along said parting line into an assembled form.

5. A hemodialyzer case of claim 4 including lock means for coacting with said shell member and wedging element to hold said case in said assembled form.

6. A hemodialyzer case of claim 4 wherein said shell member includes at least one sealant injection port for injecting initially fluid sealant into said case, and means for reinforcing said parting line adjacent said sealant injection port to confine said fluid sealant inside said case.

7. A hemodialyzer case of claim 4 including alignment means for coacting with said shell member and wedging element to align the parts of said shell member in proper relationship as said two parts are brought together along said parting line.

8. A hemodialyzer case of claim 4 wherein the inner wall of said wedging element includes a plurality of elongated ridges thereon.

9. A hemodialyzer case of claim 4 wherein the inner wall of said wedging element is generally planar and includes means for supporting a semipermeable membrane in a position normally out of contact with the generally planar surface of said wedging element.

10. A hemodialyzer of claim 4 wherein a sealant receptacle means is provided adjacent said parting line for receiving excess sealant.

11. A hemodialyzer of claim 4 including at least one generally planar semipermeable membrane confined within said rigid case, a flexible sealant sealing at least two of the edges of said membrane to said rigid case.

12. A hemodialyzer comprising:
a substantially rigid case including a preformed shell member, at least one preformed wedging element, and a stack of dialyzing membrane, said shell member having blood ports and dialysate ports therein and being divided along a parting line into two parts, said wedging element extending generally perpendicular to said parting line, the inner walls of said shell member and said wedging element together defining a generally rectangular cavity for receiving said stack of dialyzing membrane, said shell member and wedging element having wedgedly coacting surfaces adapted to wedgedly coact to restrain and seal said stack and prevent the application of substantial shearing forces to said dialyzing membrane as said two parts are brought together along said parting line.

13. A hemodialyzer of claim 12 including a sealant sealing said stack of dialyzing membrane to said case means to prevent the intermixing of blood and dialysate.

14. A hemodialyzer of claim 12 wherein said stack of dialyzing membrane includes a plurality of semipermeable membrane panels arranged so as to define a blood flow channel on one side of each said panel and dialysate flow channel on the other side of each said panel, a dialysate permeable support member positioned in each said dialysate flow channel, said support member including a plurality of first elongated elements spaced apart from one another extending generally parallel to one another in about a first plane and a plurality of second elongated elements spaced apart from one another extending generally parallel to one another in about a second plane, said first and second planes extending adjacent and generally parallel to one another and said first elongated elements extending in a different direction from said second elongated elements.

15. A hemodialyzer of claim 14 wherein at least one of said first and second elongated elements has a round cross section.

16. A hemodialyzer of claim 14 wherein at least one of said first and second elongated elements has a triangular cross section.

17. A hemodialyzer of claim 12 wherein said stack of dialyzing membrane includes a semipermeable membrane folded into a plurality of pleats to define generally planar, parallel blood and dialysate flow channels, respectively, a last pleat of said semipermeable membrane being sealed between said wedgedly coacting surfaces.

18. A hemodialyzer of claim 17 wherein said stack of dialyzing membrane is sealed with a sealant to confine the flow of blood and dialysate to respective blood and dialysate flow channels, said sealant being a generally flexible, initially fluid, cured in situ sealant.

19. A hemodialyzer comprising:
a substantially rigid case having blood ports and dialysate ports and including a shell member and at least one wedging element assembled together, said shell member and said element having wedgedly coating surfaces, said shell member and said element being preformed prior to being assembled; and
a semipermeable membrane folded in a plurality of pleats and confined within said case, a last pleat of said membrane extending between and sealed to said coating surfaces.

20. A device comprising:
a substantially rigid case including a preformed shell member having inlet and outlet ports and at least one preformed wedging element, said shell member and said wedging element having wedgedly coacting surfaces; and
a semipermeable membrane folded in a plurality of pleats and confined within said case, a last pleat of said membrane extending between and sealed to said coating surfaces.

21. Process of manufacturnig a hemodialyzer comprising:
selecting a case having initially separable shell portions and wedging elements, said wedging elements being adapted to wedgedly coact with said initially separable shell portions during the assembly of said case, said shell portions and wedging elements being preformed to a solid state prior to said selecting, said case being adapted to receive and contain a stack of semipermeable membrane material;
providing said stack and confining said stack between said wedging elements to produce a confined stack; and
inserting said confined stack into said initially separable shell portions whereby said wedging elements coact wedgedly with said one initially separable shell portion to permit said hemodialyzer to be assembled without subjecting said semipermeable membrane material to substantial shearing forces.

* * * * *